Patented Oct. 6, 1936

2,056,208

UNITED STATES PATENT OFFICE 2,056,208

ACETYL-SALICYLIC ACID COMPOSITION

Earl B. Putt, New York, N. Y.

No Drawing. Application January 21, 1933,
Serial No. 652,928

6 Claims. (Cl. 167—65)

This invention relates to an improved acetyl-salicylic acid composition, and more particularly to a stable solution of acetyl-salicylic acid, i. e. "aspirin", which term is hereinafter employed for the sake of brevity of expression.

The principal object of this invention is to provide an aspirin composition from which the aspirin may be absorbed in substantially undecomposed condition by the human system when the composition is applied to unbroken skin.

A further object of the invention is to render aspirin available for external application without causing the decomposition thereof.

A further object of the invention is to provide a stable solution of aspirin which is absorbed by unbroken skin when applied as a rub or liniment.

Further objects and advantages of the invention will become apparent during the course of the following description.

As is well known, aspirin is now used in medicine almost exclusively in dry form suitable for swallowing or for local action on the mucous surfaces of the mouth. While aspirin is sometimes dissolved in water or other ordinary solvent such as alcohol or glycerin for internal administration, the aspirin in such solutions decomposes quite rapidly into its components, salicylic acid and acetic acid, as is well known. Therefore, solutions of aspirin are not commercially available, and when prepared from the dry forms of aspirin which are available, are not capable of introducing the aspirin into the system unless the solutions are taken internally and are used promptly after their preparation. In addition, even when taken internally the hydrolytic action of the digestive juices of the stomach and intestines largely decomposes the aspirin with the result that it is necessary to administer relatively large doses in order that a sufficient amount of the aspirin will survive the decomposing effect of the digestive processes to produce the desired systemic effects.

As a result of extensive experiments directed to providing an aspirin composition which could be made commercially available in liquid form, and also in an effort to render aspirin suitable for external application and in a form wherein the aspirin would remain undecomposed for a sufficient period of time to permit its absorption by unbroken skin, I have produced a solution of aspirin which is stable over long periods and from which the aspirin is absorbed as such when the solution is applied to unbroken skin in the form of a liniment or ointment.

I have discovered that the requirements for producing a stable solution of aspirin for commercial use are that a solvent be employed which will readily dissolve aspirin and be of such a character that the resulting solution will be free from materials having a decomposing effect on aspirin. In particular, I have discovered that the solvent, which may be either solid or liquid, must be substantially free from water, alkalies, and water-soluble acids. While it is not absolutely necessary, it is preferred that the solvent shall be insoluble in water. Among the solvents which I have found to possess the desired characteristics are glycol oleate, camphor oil, lard, lard oil, seed oils such as cottonseed oil, hydrogenated oils, cocoa butter, palm oil, cocoanut oil, methyl salicylate, ethyl salicylate, sulfonated oils, and oleic acid. All of these solvents provide stable solutions of aspirin and the aspirin is absorbed therefrom by unbroken skin relatively rapidly. I have also found that aspirin is absorbed, but more slowly, from solution in soft petrolatum. The essential oils such as peppermint oil, pine oil, and lavender oil are good solvents of aspirin and, when neutral, yield stable solutions from which aspirin may be absorbed by the skin. As will be apparent to those skilled in the art, each of the solvents listed above has a boiling point above that of water, i. e. above 100° C.

In preparing the new aspirin compositions, the solvent is chosen according to the type of composition desired. For example, if a rub or liniment is desired, a liquid solvent is chosen whereas if an ointment is desired it is preferred to select a solid or semi-solid solvent such as a fatty base. In this case, I have found that the solution of the aspirin is facilitated by first melting the fatty solvent and then dissolving the aspirin therein. If desired, essential oils may be used either as solvents or in admixture with other solvents for their effect as rubefacients. Nonsolvents, such as capsicum, can also be used as rubefacients. I have found that the employment of a rubefacient in the new composition is advantageous since it increases the local blood supply at the point where the composition is applied, thereby facilitating the absorption of the aspirin into the system.

The new composition may be prepared in various ways and with various concentrations of aspirin. The particular form of composition will depend upon the purpose for which it is to be used. For example, a simple form of aspirin rub may be prepared by dissolving 30 grains of aspirin in 1 ounce of glycol oleate. However, I have found that a liquid rub having the following composition is suitable for general use and adapted for the treatment of various conditions:

| | |
|---|---|
| Aspirin | grams 16 |
| Acetone | cc 10 |
| Methyl salicylate | cc 50 |
| Glycol oleate | cc 10 |
| Oil of cassia | cc 2 |
| Oleoresin of capsicum | cc 20 |
| Oil of cloves | cc 2 |
| Oil of camphor | cc 140 |
| Cottonseed oil | cc 15 |

The aspirin is soluble in each of the ingredients in varying proportions but dissolves readily without heat in a mixture of all of the ingredients, except the oleoresin of capsicum. This material is added last and any slight sediment present is preferably removed by filtration.

In administering the new aspirin composition, the solution, whether in liquid or ointment form, is rubbed on the skin at the inflamed or painful part of the body being treated. The aspirin is absorbed by the skin and produces the systemic effects of aspirin, and particularly the known analgesic effect of aspirin, in a short period.

That the aspirin is absorbed into the system through unbroken skin from my new aspirin composition may be readily demonstrated. For example, in one experiment a solution of 30 grains of aspirin in 1 ounce of glycol oleate was rubbed into the skin of the arm of a patient for five minutes. Four hours after this application it was found that a sample of the patient's urine, which before the treatment did not give a salicyl reaction with ferric chloride, in the well known color test, gave a distinct color reaction with that reagent, thereby showing that the aspirin had been absorbed through the skin and had entered the circulation. Samples of urine taken during the subsequent eight hours also gave a color reaction with ferric chloride. In another test with the same patient, the treated arm was exposed under an ultraviolet lamp of the mercury vapor type to determine whether the portion of the arm treated would show the strong blue fluorescence which aspirin shows under ultraviolet light. It was observed that there was not only a strong blue fluorescence of the skin where it had been rubbed with the aspirin solution but the same fluorescence also appeared on parts of the arm adjacent the area that had been rubbed. The untreated arm gave no fluorescence, thereby demonstrating that the aspirin had been absorbed into the body tissues through the unbroken skin.

It is to be understood that the term "unctuous base" appearing in the appended claims is employed in its broad sense as referring to a vehicle which is fatty, oily or greasy, and that such term embraces the preferred solvents for aspirin specifically referred to above, viz., glycol oleate, camphor oil, lard, lard oil, seed oils, hydrogenated oils, cocoa butter, palm oil, cocoanut oil, methyl salicylate, ethyl salicylate, sulfonated oils, oleic acid, petrolatum, and essential oils such as peppermint oil, pine oil and lavendar oil.

While I have described in detail the preferred practice of my invention it is to be understood that the details of procedure may be variously modified without departing from the spirit of the invention or the scope of the subjoined claims.

I claim:

1. A liniment or rub for external application to the human body comprising aspirin, a substantially non-hygroscopic solvent thereof which is substantially inert with respect thereto and is substantially free from water, alkali and water-soluble acid, and a rubefacient which is a solvent for aspirin.

2. A medicament suitable for application to the human body comprising aspirin dissolved in a substantially anhydrous unctuous base which is a substantially non-hygroscopic solvent thereof, which is substantially inert with respect thereto, and which is substantially water insoluble.

3. A medicament suitable for application to the human body which comprises a solution of aspirin in a substantially anhydrous solvent comprising glycol oleate.

4. A medicament suitable for application to the human body which comprises a solution of aspirin in a substantially anhydrous solvent comprising an oil selected from the group consisting of glycol oleate, methyl salicylate, ethyl salicylate, camphor oil, lard oil, palm oil, cocoanut oil, peppermint oil, pine oil and lavender oil.

5. A medicament suitable for application to the human body which comprises a solution of aspirin in a substantially anhydrous solvent comprising pine oil.

6. A medicament suitable for application to the human body which comprises a solution of aspirin in a substantially anhydrous solvent comprising methyl salicylate.

EARL B. PUTT.